United States Patent [19]

Engel et al.

[11] 4,456,207
[45] Jun. 26, 1984

[54] TURNING A PALLET OR CONTAINER

[75] Inventors: Hinrich Engel, Bremen; Eckhard Koch, Lilienthal; Günther Vogg, Bremen, all of Fed. Rep. of Germany

[73] Assignee: MBB/VFW GmbH, Bremen, Fed. Rep. of Germany

[21] Appl. No.: 339,128

[22] Filed: Jan. 13, 1982

[30] Foreign Application Priority Data

Jan. 23, 1981 [DE] Fed. Rep. of Germany ....... 3102146

[51] Int. Cl.³ ............................................. B64C 1/22
[52] U.S. Cl. .................................. 244/137 R; 410/81; 414/498
[58] Field of Search ................... 244/137 R; 198/472, 198/457; 104/48, 49, 50; 414/676, 498, 499, 500; 410/80, 81

[56] References Cited

U.S. PATENT DOCUMENTS 3,219,218 11/1965 Hand .................................. 414/499
4,301,984 11/1981 Olason ............................. 244/137 R
4,354,796 10/1982 Bergman ........................... 414/676

Primary Examiner—S. D. Basinger
Assistant Examiner—Ivy M. Shum
Attorney, Agent, or Firm—Ralf H. Siegemund

[57] ABSTRACT

A pin extends from the floor near a cargo door and pallets or containers are provided with an attachment which includes a releasable frame with a hinged spring-loaded plate having a bore and runoff surfaces. The bore traps the pin and forces the pallet or container to turn.

12 Claims, 5 Drawing Figures

TURNING A PALLET OR CONTAINER

BACKGROUND OF THE INVENTION

The present invention relates to positive steering of cargo pallets, containers, or the like; and more particularly, the invention relates to positively changing the travel path of pallets carrying a bulky, overhanging load and being moved, for instance, inside an airplane.

Commercial aircraft are frequently equipped with rather large cargo doors. Accordingly, rather bulky pieces of cargo can readily be passed through such doors. Cargo planes of the "jumbo" variety usually have a very large freight door leading into the area which is otherwise used as a passenger compartment. These doors are so large that one may pass through an entire engine from which only the shroud or other covering has been removed.

Generally speaking, it is, of course, important that the cargo as it is moved about in the aircraft will not damage any structure. This is, of course, true not only for passage of the load through the door, but also for maneuvering inside the aircraft; the cargo must not hit the fuselage frame, at least not hard enough to cause any damage. Conversely, damage to the cargo must also be avoided.

The problem requires some detailed analysis. A piece of freight or cargo will be moved through the door, clearly perpendicular to the plane of the door opening. Inside the plane, the cargo will have to be moved more or less parallel to the transverse axis of the plane up to the area of storage. That is to say, the load has to be turned inside the plane. This may pose problems if the piece of freight is long; it may well pass through the door, but swinging it around inside the plane may be a problem. One cannot rely here on trial and error by the cargo handlers. Also, the long piece should not hit the opposite wall of the aircraft. The same problem, of course, exists during unloading.

DESCRIPTION OF THE INVENTION

It is an object of the present invention to provide for positive steering, particularly turning of aircraft cargo pallets, containers, or the like, in a manner that avoids damage to the cargo as well as to the aircraft.

In accordance with the preferred embodiment of the present invention, it is suggested to equip pallets, containers, or the like, with a trap element that can capture a stationary bolt so that the respective pallet, etc., is forced to turn until disengaged from the pin. Preferably, a frame element is releasably fastened to one side of the pallet or container and near the bottom thereof. A trap plate is hinged to the frame and is preferably spring-biased. The trap plate has an opening flanked by runoff surfaces. A pin is, for example, provided in the floor structure of the aircraft near, but somewhat spaced from the cargo door. The pallet or container will be pushed right through the door until its trap plate captures the pin, whereupon the pallet, etc., is forced to turn. Upon disengaging the plate from the pin, the pallet, etc., is now free to be pushed further, e.g., in the direction to the longitudinal axis of the aircraft.

The invention can be practiced with great advantage because the attachment (frame plus plate) can be fastened to existing pallets and containers; the latter do not need to be structurally changed. Also, the point of attachment can be selected so that the pivot point can be chosen as required under the circumstances, such as the length of the portion of the cargo that projects beyond the confines of the pallet. In other words, the exact position of turning can be predetermined by affixing the attachment at a point which, upon alignment with the stationary pin in the aircraft, establishes the exact and correct position for turning the pallet under the particular load conditions.

The preferred embodiment of the invention, the objects and features of the invention, and further objects, features and advantages thereof, will be better understood from the following description taken in connection with the accompanying drawings.

DESCRIPTION OF THE DRAWINGS

Proceeding now to the detailed description of the drawings, FIG. 1 illustrates an airplane 1, and the forward portion of the fuselage is provided with a cargo door 2. The deck, which normally constitutes the passenger compartment, is accessed through that door for purposes of cargo loading, including particularly the loading of containers and pallets. The door 2 is sufficiently large so that, for instance, a complete engine, such as 3, and appended equipment (except for covers) may pass through. The engine 3 is, for example, placed on a pallet 4 and suitably tied thereto to be held securely thereon. The pallet thus moves the engine about in the aircraft.

Figure 1:
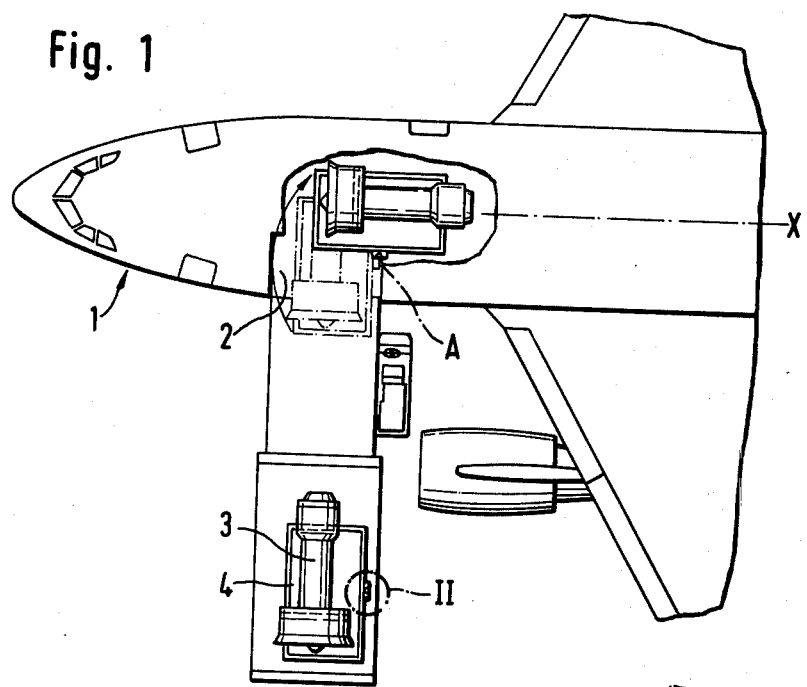
FIG. 1 is a top elevation of the front portion of an aircraft which includes particularly the area of a cargo door; a roof portion of the fuselage has been cut away for illustrating purposes.

Reference character X denotes the longitudinal axis of the aircraft. The freight will approach door 2 and be moved therethrough and further in a direction basically transverse to that direction X; inside the aircraft the pallet will be moved at one time or another along the direction X or parallelly thereto. In particular, the pallet will be moved into and through the door, but not necessarily completely. Rather, a turning motion is superimposed to turn the pallet, preferably into alignment or near-alignment with the axis X. Thereafter, the pallet is moved in the direction X to the place of storage. This turning operation is carried out under utilization of an attachment constructed in accordance with the invention and to be explained by way of example with reference to FIGS. 2 to 5.

FIG. 1 identifies further a point A, inside the cabin of the aircraft, but more or less in alignment with one side, e.g., the right side of door 2. A particular pin, identified as pin 7 in FIGS. 2 to 5, extends from the floor and conveyor plane of the upper deck in the aircraft, just in point A. The inventive pallet attachment is constructed for cooperation with such a pin. The pin establishes a turning point, A, for such a pallet.

Figure 2:
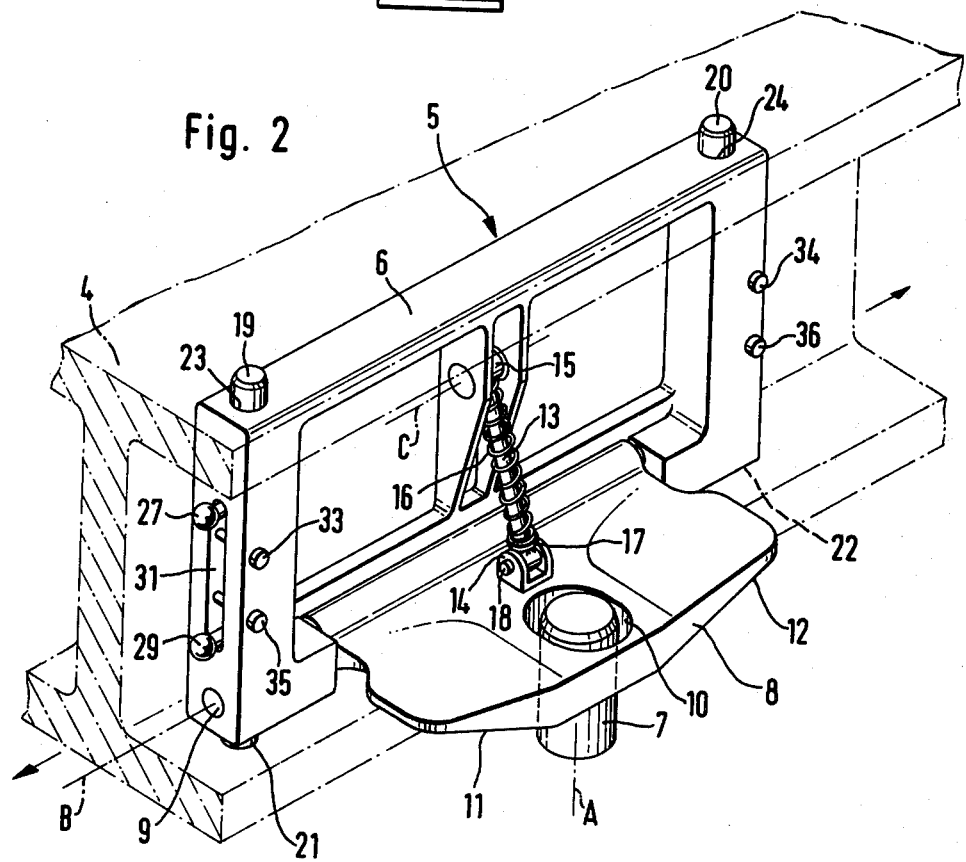
FIG. 2 is a perspective view on an enlarged scale of the area denoted II in FIG. 1, referring specifically to an attachment for an aircraft pallet constructed in accordance with the preferred embodiment of the invention for practicing the best mode thereof.
Figure 3:
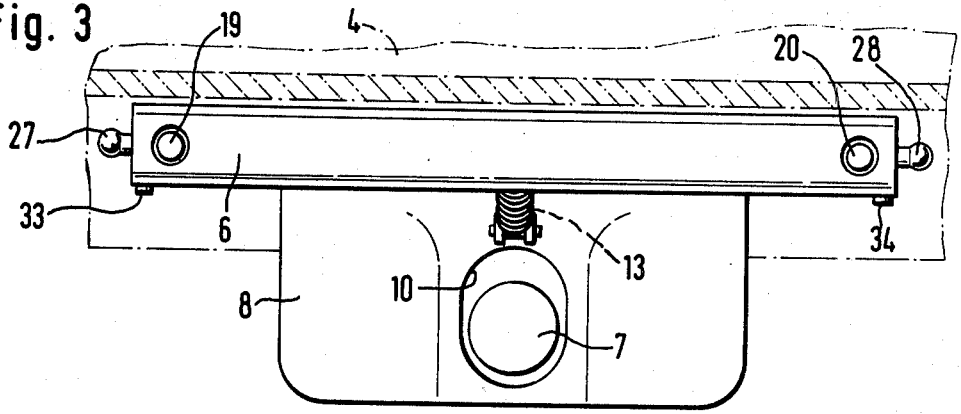
FIG. 3 is a top elevation of the structure shown in FIG. 2.
Figure 4:
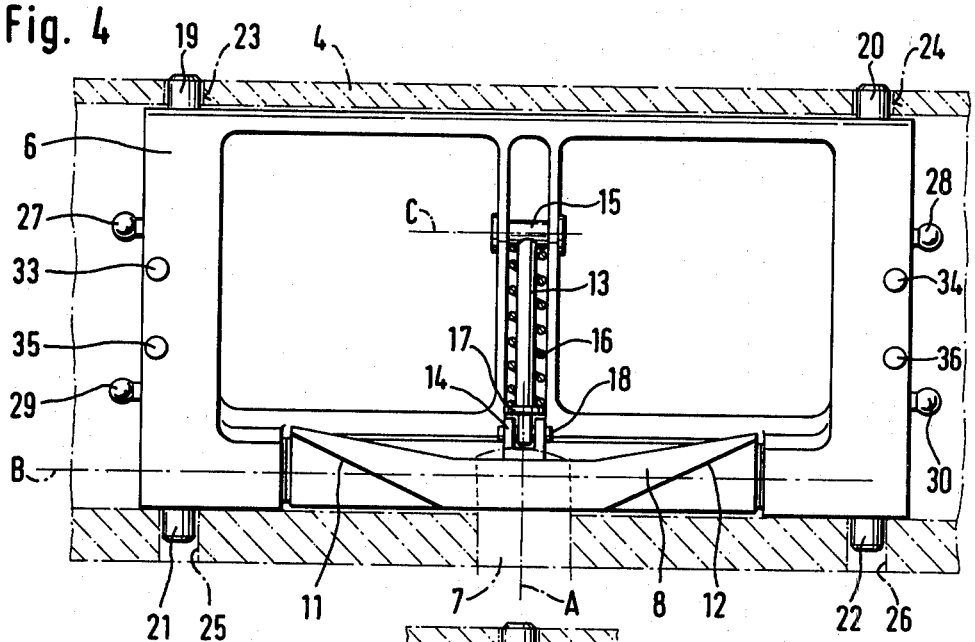
FIG. 4 is a front view of the structure shown in FIGS. 2 and 3.
Figure 5:
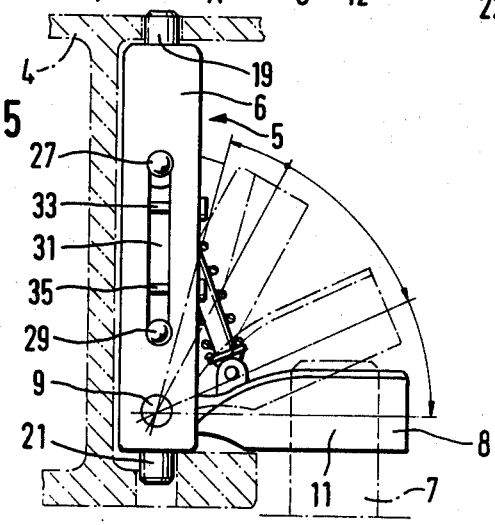
FIG. 5 is a side elevation of the structure shown in FIGS. 2, 3, and 4.

FIG. 2 et seq. illustrate a side portion of a pallet 4; and it is presumed that, customarily, the pallet has two longitudinal ridges, an upper one and a lower one, which together define a laterally facing trough. An attachment element 5 is releasably secured to the pallet, inside the trough, at any point along the one long side of the pallet.

This supplemental attachment element 5 includes a frame 6 which is fastened to the pallet 4 by means of spring-loaded pins 19, 20, 21, and 22, respectively snap-inserted in openings 23, 24, 25, and 26, within the trough-defining ridges of the pallet.

A fold-down plate element 8 is hinged to the frame 6 and has an aperture 10 for receiving the pin 7 as it extends from the floor structure of the aircraft. Upon folding plate 8 down and inserting pin 7, a pivot about a vertical axis (point A) for the pallet is established; the pallet is, in effect, trapped and will be forced to turn.

More particularly, trap plate 8 is hinged by means of a pin or rod 9 for pivoting about an axis B. The bore 10 is oblong, and its narrow part is a little wider than the diameter of the pin 7 to ensure that it will not bind. Trap plate 8 has a shallow V-shaped cross section and contour resulting in obliquely oriented runoff surfaces 11 and 12 flanking a thick and strong center portion which includes the bore 10.

Trap plate 8 is additionally connected to frame 6 by means of a rod 13. For this, plate 18 is provided with a bearing block 14 in which is journalled one end of the rod 13. It is important that this point of engagement is laterally offset from axis B to, thereby, establish a lever arm for pivoting actuation of trap element 8.

The other end of rod 13 is slidingly received in a bore of a transverse guide pin 15 having stop or limit flanges at both ends. This pin 15, in turn, is journalled in two transverse plates being parts of the frame 6. The pin 15 can, thus, pivot about an axis C, and rod 13 can pivot accordingly. Moreover, pin 15 serves as an axial guide for the rod to obtain the requisite length compensation.

A compression spring 16 is concentrically arranged around rod 13, bearing with one end against pin 15 and with the other end against an annular shoulder 17 of rod 13, the shoulder being situated near the bearing block 14. The pivot 18 of the rod 13 on trap plate 8 has been chosen so that, in the folded-up position of plate 8, rod 13 assumes an over-center position; and the member 8 will be stably held in that folded-up position, even though the spring is compressed. Plate 8 is folded down by pushing it over the deadcenter position, whereupon the decompressing spring takes over in order to place the plate into a horizontal position. The lower ridge of the pallet may serve here as a stop (see bottom of FIG. 5 and bottom center of FIG. 4).

As stated earlier, the frame 6 is held in the pallet 4 by means of four spring-biased pins 19 to 22. The springs have been omitted for the sake of clarity. In order to facilitate installation and removal of the entire attachment 5, the pins 19 to 22 are respectively provided with relatively small, lateral pins 27, 28, 29, and 30 which end in small balls and extend in pairs from two oblong slots 31 and 32 in the frame 6. Pins 27 and 29 extend through slot 31, and pins 28 and 30 extend through slot 32. These slots 31 and 32 include additionally transverse stops 33, 35 and 34, 36 in order to limit the extend of retraction of these pins 19, etc.

In operation, the inventive structure and system functions as follows. An attachment member 5 of the type described is affixed to a pallet 4 which carries a large load, particularly one which extends beyond the bounds of the pallet. The circle II in FIG. 1 denotes such a location. The particular point of attachment of the accessory or attachment 5 on the long side of the pallet depends to some extent on the degree of projection of the load from one end or the other or both.

The trap plate 8 is folded up as long as the pallet is moved about in the airport. Upon approaching the cargo door, plate 8 is folded down (e.g, by foot operation of the operator) and held in the folded-down position by the spring 16. The pallet 4 is now moved further in direction of the lower left-hand arrow in FIG. 2 and through the door; soon, run-off surface 12 will be engaged by the pin 7. The attachment 5 will have been fastened on a point of the pallet ensuring that the load when passing through the door will not be moved too far in order to avoid hitting the wall opposite the door.

The rigid pin will push the plate 8 up a little until the plate drops over the pin and the pin is trapped by the opening 10, causing the spring 16 to push member 8 down again to positively trap the pin. Since pin 7 is stationary, the pallet is, in effect, caught. Further, the moving force exerted on the pallet 4 in the direction E (transverse to X in FIG. 1) will cause the pallet to swing around pivot pin 7. The pallet cannot be pushed further but is, indeed, forced to turn.

After the pallet has been pivoted sufficiently far, trap plate 8 is pivoted up, thereby releasing the pallet from the pin 7. Folding plate 8 back over-center ensures it to stay in the folded-up position so that it does not serve as an obstacle. The pallet can now be shifted along axis X to the storage point. Upon unloading, the sequence is reversed; i.e., the pallet will again be pivoted about pin 7 before pushing the pallet out of the cargo space. In this case, run-off surface 11 will be used as the pallet is pushed in the direction of the upper right-hand arrow in FIG. 2.

The invention is not limited to the embodiments described above; but all changes and modifications thereof, not constituting departures from the spirit and scope of the invention, are intended to be included.

We claim:

1. A system for forced turning of pallets, containers, or the like, inside the cargo space of an aircraft, there being a floor construction in the aircraft, the combination comprising:

a pivot pin extending upward from the floor construction;

an accessory member being fastened to a pallet or container and having a fold-down trap plate with a bore;

so that upon engagement of the pin in the bore of the trap plate, the pallet or container is forced to pivot about the pin, thereby changing its direction of movement during loading and unloading of the aircraft.

2. In combination with an air cargo pallet or container:

a frame member;

a trap plate pivoting in the frame member about an axis parallel to a longitudinal axis of the container or pallet being a direction of movement thereof; and a bore in the trap plate for engagement with a pin, not structurally combined with the pallet or container to, thereby, compell the pallet or container to turn about the pin.

3. An attachment or accessory for aircraft pallets or containers, to be releasably fastened thereto, comprising:

a frame member;

a trap plate pivoting in the frame member about an axis parallel to a longitudinal axis of the container or pallet being a direction of movement thereof; and a bore in the trap plate for engagement with a pin, not structurally combined with the pallet or container to, thereby, compell the pallet or container to turn about the pin.

4. The combination as in claim 1, 2 or 3, the plate being spring-loaded into a folded-down position.

5. The combination as in claim 4, the plate being pivoted to be in an over-center position when folded up.

6. The combination as in claim 1, 2 or 3, the plate having oblique run-off surfaces facing in down-direction when the plate is folded down.

7. The combination as in claim 1, the accessory member including a frame releasably fastened to the pallet or container.

8. The combination as in claim 2 or 3, the plate being spring-loaded into a fold-down position, further including a rod pivoted to the plate and the frame, and being axially movable in one pivot point, respective pivot axes running parallel to a pivot axis of the plate or frame.

9. The combination as in claim 8, spring-loading being provided by a coil spring being received by the rod, the rod having a shoulder against which bears the spring.

10. The combination as in claim 7, 2, or 3, there being spring-biased pins in the frame for holding the frame on the pallet or container.

11. The combination as in claim 7, including a rod pivoted to the plate and the frame, and being axially movable in one pivot point, respective pivot axes running parallel to a pivot axis of the plate or frame.

12. The combination as in claim 11, spring-loading being provided by a coil spring being received by the rod, the rod having a shoulder against which bears the spring.

* * * * *